Nov. 24, 1959  D. J. HAYMAN  2,914,369
FLUID SEAL
Filed March 18, 1958

INVENTOR.
DENNIS J. HAYMAN
BY
Lieber, Lieber & Nilles
ATTORNEYS

United States Patent Office 2,914,369
Patented Nov. 24, 1959

2,914,369

FLUID SEAL

Dennis J. Hayman, Milwaukee, Wis., assignor to Blackhawk Mfg. Co., West Allis, Wis., a corporation of Wisconsin Application March 18, 1958, Serial No. 722,245

10 Claims. (Cl. 309—34)

This invention relates to fluid seals for sealing between relatively moving parts, such as a piston and cylinder. More particularly the invention relates to a two stage seal having a comparatively hard sealing material that is effective to seal at high pressures and a more resilient material for sealing at lower and zero pressure.

Fluid seals of this general nature are used, for example, in hydraulic jacks, rams and the like, and must operate over a wide range of pressures. For sealing against high pressures, the sealing material must be strong and rigid enough to prevent its extrusion through the clearance between the relatively moving parts. This hard sealing material is unsuitable for sealing light pressures because it cannot be installed too tightly so as to cause undue friction and consequent wear between the parts. On the other hand, a sealing material that is sufficiently resilient to seal at low or zero pressures tends to extrude between the piston and cylinder unless commercially prohibitive clearance tolerances are employed.

Prior art devices have therefore been proposed and used with considerable success which utilize a rather hard sealing cup carried on the piston, in which cup is inserted a resilient ring or grommet that acts to deform at higher pressures and thereby forces the cup into engagement with the cylinder. At low or zero pressure the cup acts by itself to seal against the cylinder wall.

In accordance with the present invention a two-stage fluid seal of the above general type has been provided which is particularly efficient in sealing at pressures ranging from zero to very high values.

More particularly, the invention provides a compound seal assembly which has a cup-shaped member of relatively hard material that presents a considerable sealing area to seal against high pressures. The assembly also provides a resilient member that is deformed by high pressures to cause said considerable area to move to the sealing position, and which resilient material at low or zero pressures acts by itself to provide the seal. The result is a sealing assembly which provides better low pressure sealing, without excessive friction between cup and cylinder.

These and other objects and advantages of the invention will appear later as this disclosure progresses, reference being had to the accompanying drawings, in which.

Figure 1:
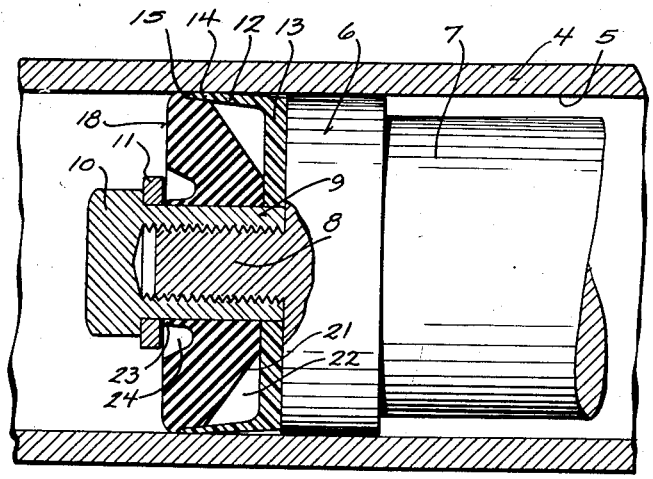
Figure 1 is an axial cross sectional view of a cylinder and piston arrangement which utilizes the present invention, certain parts being broken away, and showing the device when at low or zero pressure.

Referring in greater detail to the drawings, the cylinder 4 has a bore 5 in which the piston 6 is reciprocatingly mounted. The diameter of the piston is less than the bore diameter and therefor dimensional tolerances required between these parts are not so close as to present manufacturing difficulties or cause high frictional resistance to relative movement. A piston rod 7 extends from one end of the piston, the latter of which is press fit onto the rod or may be formed integrally therewith if desired.

Means are provided on the other end of the piston for detachably securing the seal, to be described later, to the piston.

The piston 6 has a threaded extension 8 extending therefrom and formed integrally therewith. A spacer 9 which forms a mounting shaft is threadably engaged on the extension, which spacer has an integrally formed hexagonal nut portion 10 on its outer end. A washer 11 is slipped on the spacer before assembly on the extension.

A two piece fluid seal is provided comprising an outer relatively hard member and an inner resilient member, as follows. A sealing cup 12 is positioned around spacer 9 and has a disk portion or end wall 13 which is of less diameter than the cylinder's internal diameter. The cup also includes an axially extending flange 14 which is formed integrally at one end with wall 13 and becomes progressively thinner toward its free edge or lip 15. Cup 12 is of relatively hard material, such as nylon preferably, which is only somewhat resilient so as to be incapable of extruding into the clearance between the cylinder and piston.

Figure 3:
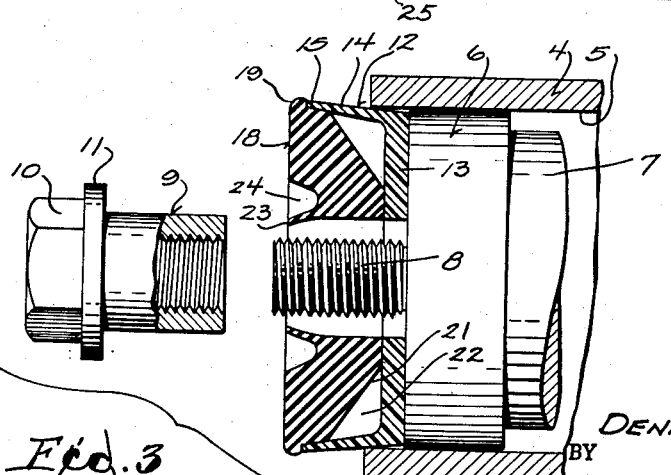
Figure 3 is a view similar to the other figures, but with the piston assembly partially exploded and as it appears before being fully inserted in the cylinder.

As shown in Figure 3, the diameter of the bore contacting lip 15 of the cup is normally slightly larger than the internal diameter of the cylinder so that a substantial portion of the cup contacts the cylinder when the cup is drawn into the cylinder, as shown in Figure 1.

A resilient diaphragm or grommet 18 is formed of rubber or the like, and is inserted within the cup and snugly embraces the spacer 9. The axial length of the diaphragm 18 is somewhat longer than the flange 14 of the cup and the rounded tip 19 of the diaphragm is made to extend beyond the lip edge 15 of the cup. As shown in Figure 3, the diameter of the tip 19 is normally greater than the free edge of the cup so that the tip 19 bears firmly against the cylinder when low or zero pressure is present, as shown in Figure 1.

The inner side of the rubber grommet is cut away on the normally inclined line 21 to form a cavity 22 between the cup and grommet.

Another lip 23 is formed on the central portion of the outer side of the diaphragm by the annular recess 24 which acts to seal against the spacer 9. The diaphragm is so molded that the lip 23 has an internal diameter less than the diameter of the spacer and when assembled thereon acts to seal snugly against the spacer.

To assemble the piston unit, the washer 11 is first slipped on the spacer. The diaphragm 18 is inserted in the cup and the diaphragm and cup assembly is then slipped on the spacer. The spacer in turn is then threaded tightly on the extension 8. It will be noted that the washer does not act to pre-compress the diaphragm, and sealing between the diaphragm and spacer, at low or zero pressures, is accomplished solely by the lip 23.

Other means may be employed for fastening the seals to the piston and still fall within the scope of the present invention. For example, while the washer 11 aids in holding the piston assembly together and protects lip 23, it may preferably be omitted. Furthermore, instead of a spacer 9 and extension 8 as shown, a cap bolt may have an end portion threaded directly into the piston and on which bolt the seals would be mounted. In any case, an extension or shaft is provided for mounting the seals on the piston.

Figure 2:
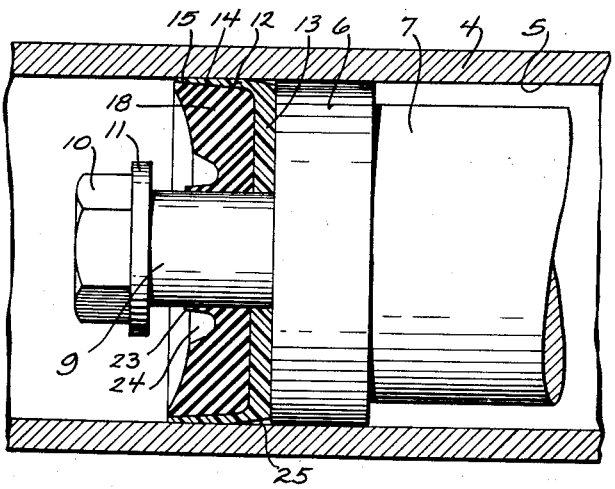
Figure 2 is a view similar to Figure 1, but showing the arrangement when sealing against high pressure.

The arrangement is such that as sufficient pressure develops in the cylinder, the fluid will cause the flexible rubber diaphragm to be pushed into the cup, as shown in Figure 2, thus withdrawing the tip 19 from contact with the cylinder bore and into the cup. An orderly withdrawal of the diaphragm into the cup is assured by the action of the pressure fluid. More specifically, the outer edges of the diaphragm tend to withdraw first into the cup before its central portion compresses.

As the diaphragm is compressed, some of the air in cavity 22 passes outwardly between the diaphragm and cup, then between the spacer and cup and then between the cup and piston. Air returns in the same manner to the cavity as the diaphragm expands.

The rubber diaphragm, as it is compressed, urges a considerable portion of the flange 14 into sealing engagement with the cylinder, as shown in Figure 2. It will be noted, however, that the heel 25 of the cup does not engage the wall even at high pressures and wear of the cup in the area of the heel is thereby avoided. As the pressure in the cylinder increases, the lip 23 bears even more tightly against the spacer to provide a tight seal.

By means of the present invention, friction between the cup and cylinder is held to a minimum for low pressure operation where excessive friction detrimentally affects good performance and wear life of the seals. When higher pressures develop in the cylinder, the rubber diaphragm retracts in an orderly manner into the cup and simultaneously urges the latter into sealing engagement with the cylinder for high pressure operation. This two stage seal permits the use of less exacting dimensional tolerances of the parts, which results in an economically produced structure.

Various modes of carrying out the invention are contemplated as being within the scope of the following claims particularly pointing out and distinctly claiming the subject matter which is regarded as the invention.

I claim:

1. A fluid seal for use in hydraulic rams or the like having a cylinder and a piston reciprocatingly mounted in said cylinder and of less diameter than the bore of said cylinder, said seal comprising, a cup packing having an end wall and also having a generally axially extending flange of progressively thinner cross-section and terminating in a bore contacting lip, and a resilient and distortable grommet seated within said cup and having a sealing lip normally extending therefrom and adapted to be engaged with said bore at zero pressure, said grommet retractable into said cup at cylinder pressures over a predetermined value whereby a substantial portion of said cup flange is adapted to be urged into sealing engagement with said bore.

2. A fluid seal for use in hydraulic rams or the like having a cylinder and a piston reciprocatingly mounted in said cylinder and of less diameter than the bore of said cylinder, said seal comprising, a cup packing having a flat end wall of less diameter than said bore, said packing also having a thinner generally axially extending flange integrally united at one end with said end wall and terminating at its other end in a bore contacting lip, and a resilient and distortable grommet of greater axial length than said flange seated within said cup with a portion extending outwardly beyond said lip, said extending portion of said grommet having a peripheral edge normally extending therefrom beyond said lip and adapted to be engaged with said bore at zero pressure, said grommet compressible into said cup at cylinder pressures over a predetermined value whereby a substantial portion of said cup flange is adapted to be urged into sealing engagement with said bore.

3. A fluid seal for use in hydraulic rams or the like having a cylinder, a piston reciprocatingly mounted in said cylinder and of less diameter than the bore of said cylinder and having a seal mounting shaft extending therefrom, said seal comprising, a cup packing having an end wall adapted to be mounted on said shaft, said packing also having a generally axially extending flange terminating in a bore contacting lip, and a resilient and distortable grommet adapted to be mounted on said shaft and with one end thereof seated against said end wall within said cup, the other end of said grommet extending outwardly beyond said flange lip and having a sealing lip normally extending laterally therefrom and adapted for engagement with said bore at zero pressure, said grommet adapted to be forced into said cup by cylinder pressures over a predetermined value whereby a substantial portion of said cup flange is adapted to be urged into sealing engagement with said bore.

4. A fluid seal for use in hydraulic rams or the like having a cylinder, a piston reciprocatingly mounted in said cylinder and of less diameter than the bore of said cylinder and having a seal mounting shaft extending therefrom; said seal comprising, a cup packing having a flat end wall of less diameter than said bore and adapted to be mounted on said shaft, said packing also having a thinner generally axially extending flange integrally united at one end with said end wall and of progressively thinner cross-section terminating at its other end in a bore contacting lip, and a resilient and distortable grommet adapted to be mounted on said shaft and within said cup and having a sealing lip normally extending laterally therefrom beyond said flange lip for engagement with said bore at zero pressure, said grommet forcible into said cup by cylinder pressures over a predetermined value whereby a substantial portion of said cup flange is adapted to be urged into sealing engagement with said bore.

5. A fluid seal for use in hydraulic rams or the like having a cylinder, and a piston reciprocatingly mounted in said cylinder and of less diameter than the bore of said cylinder and having a seal mounting shaft extending therefrom; said seal comprising, a cup packing having an end wall mountable on said shaft, said packing also having a generally axially extending flange terminating in a bore contacting lip, and a resilient and distortable grommet mounted within said cup and having an inner end of reduced area engaging a portion only of said wall, said grommet including an outer end having a sealing lip normally extending from said cup beyond said flange lip and being adapted for engagement with said bore at zero pressure, said grommet also having an annular recess in said outer end and adapted to be forced into said cup by cylinder pressures over a predetermined value whereby a substantial portion of said cup flange is adapted to be urged into sealing engagement with said bore.

6. A fluid seal for use in hydraulic rams or the like having a cylinder, and a piston reciprocatingly mounted in said cylinder and of less diameter than the bore of said cylinder and having a seal mounting shaft extending therefrom; said seal comprising, a cup packing having a flat end wall mountable on said shaft, said packing also having a generally axially extending flange terminating in a bore contacting lip, and a resilient and distortable grommet sealingly mounted on said shaft and within said cup and having a normally laterally extending peripheral flange adapted to seal against said bore at zero pressure, said grommet also having an inner sealing lip for direct sealing engagement with said shaft, said grommet adapted to be forced into said cup by cylinder pressures over a predetermined value whereby a substantial portion of said cup flange is adapted to be urged into sealing engagement with said bore.

7. In combination, a cylinder having a bore, a piston reciprocatingly mounted in and of less diameter than said bore, a cup packing having an end wall and also having a generally axially extending flange terminating in a bore contacting lip, a resilient and distortable grommet seated within said cup against said end wall and having a portion extending outwardly beyond said flange lip and provided with a sealing lip normally extending into direct engagement with said bore at zero pressure, said grommet compressible into said cup at cylinder pressures over a predetermined value to force a substantial portion of said cup flange into sealing engagement with said bore, and means for securing said packing and grommet to said piston.

8. In combination, a cylinder having a bore, a piston reciprocatingly mounted in and of less diameter than said bore, a seal mounting shaft extending from said piston, a cup packing mounted on said shaft and having an end wall and also having a generally axially extending flange terminating in a bore contacting lip, a resilient and distortable grommet mounted on said shaft and within said cup and having an outer sealing lip normally extending therefrom for engagement with said bore at zero pressure, said grommet also having an inner lip of normally smaller internal diameter than the diameter of said shaft to thereby firmly bear into sealing engagement with said shaft at zero pressure, said grommet compressible into said cup at cylinder pressures over a predetermined value to thereby force a substantial portion of said cup flange into sealing engagement with said bore, and said outer lip tightly around said shaft, and means for securing said packing and grommet to said piston.

9. In combination, a cylinder having a bore, a piston reciprocatingly mounted in and of less diameter than said bore, a mounting extension on said piston, a cup packing mounted on said extension and having an end wall bearing against said piston and of smaller diameter than said bore, said packing also having a thinner and flexible axially extending flange terminating in a bore contacting lip, a resilient and distortable diaphragm mounted on said extension and within said cup and having a peripheral sealing lip normally extending therefrom for engagement with said bore at zero pressure, said diaphragm also having an annular central lip of tapered cross-section for sealing engagement with said extension, said diaphragm compressible into said cup at cylinder pressures over a predetermined value to thereby force a substantial portion of said cup flange into sealing engagement with said bore and said peripheral lip tightly around said extension, and means for detachably holding said packing and grommet captive on said extension.

10. A fluid seal for use in hydraulic rams or like having a cylinder and a piston reciprocatingly mounted in said cylinder and of less diameter than the bore of said cylinder, said seal comprising, a cup packing having an end wall and also having a generally axially extending flange terminating in a bore contacting lip, and a resilient and distortable grommet within said cup seated against the end wall thereof and having a sealing lip normally extending therefrom and adapted to be engaged with said bore at zero pressure, said grommet retractable into said cup at cylinder pressures over a predetermined value whereby a substantial portion of said cup flange is adapted to be urged into sealing engagement with said bore.

References Cited in the file of this patent

UNITED STATES PATENTS

| | | |
|---|---|---|
| 258,363 | Brooks | May 23, 1882 |
| 2,814,540 | Southerwick | Nov. 26, 1957 |